United States Patent

McMinn

[11] Patent Number: 6,098,030
[45] Date of Patent: Aug. 1, 2000

[54] METHOD AND APPARATUS FOR TRACKING POWER OF AN INTEGRATED CIRCUIT

[75] Inventor: Brian S. McMinn, Buda, Tex.

[73] Assignee: Advanced Micro Devices, Inc., Sunnyvale, Calif.

[21] Appl. No.: 09/167,826

[22] Filed: Oct. 7, 1998

Related U.S. Application Data

[62] Division of application No. 08/762,768, Dec. 10, 1996, Pat. No. 5,915,232.

[51] Int. Cl.⁷ ..................................................... G06F 15/20
[52] U.S. Cl. .......................... 702/132; 713/501; 713/502; 702/136
[58] Field of Search ................................... 702/130, 132, 702/125; 361/98; 327/113, 262; 713/300, 501; 700/46

[56] References Cited

U.S. PATENT DOCUMENTS

| | | | |
|---|---|---|---|
| 5,451,892 | 9/1995 | Bailey | 327/113 |
| 5,490,059 | 2/1996 | Mahalingaiah et al. | 700/46 |
| 5,640,329 | 6/1997 | Matsunaga et al. | 702/130 |

*Primary Examiner*—Kamini Shah
*Attorney, Agent, or Firm*—Conley, Rose & Tayon P.C.; Eric A. Stephenson

[57] ABSTRACT

An integrated circuit which includes a temperature modeling circuit for reducing operational activity of the integrated circuit when its operating temperature exceeds a predefined threshold. The temperature modeling circuit includes several multiplexers each of which corresponds to a particular sub-circuit within the integrated circuit. The multiplexers select one of at least two heat generation values inputted thereto in accordance with the operating mode of the corresponding sub-circuit. A multi-input adder adds the selected heat generation values along with values representing the rate at which heat is being dissipated by the integrated circuit, the rate at which heat is being generated by background operations of the integrated circuit, and a previous temperature of the integrated circuit. The added values relate to the current operating temperature of the integrated circuit which is compared to a predefined temperature using a comparator. When the current operating temperature of the integrated circuit exceeds the predefined value, the comparator dispatches a command instructing the integrated circuit to halt or slow its operational activity and thereby reduce its current temperature.

33 Claims, 5 Drawing Sheets

METHOD AND APPARATUS FOR TRACKING POWER OF AN INTEGRATED CIRCUIT

This application is a divison of application Ser. No. 08/762,768 filed on Dec. 10, 1996 now U.S. Pat. No. 5,915,232.

BACKGROUND OF THE INVENTION

1. Field of the Invention

The present invention relates generally to the art of integrated circuits and more particularly to a mechanism and technique for managing the die temperature of an operating integrated circuit.

2. Description of the Relevant Art

Integrated circuits operate in varying modes in response to instructions on which they operate. Each operating mode can be distinguished by an amount of power consumed by the integrated circuit. Some modes of operation consume more power than other modes. For example, in a CPU based integrated circuit, the power consumed by the integrated circuit operating in accordance with a multiply command may be greater than the power consumed by the integrated circuit operating in accordance with a shift command.

As an integrated circuit consumes power, the integrated circuit generates a corresponding amount of heat. Since integrated circuits operate in varying modes which consume different levels of power, it follows that the amount of heat generated likewise varies. Thus, one mode of operation generates more heat than another mode of operation.

Power consumption and the resulting heat generation have long been a concern for integrated circuit designers. Heat generated by the integrated circuit must be sufficiently dissipated to prevent the die temperature of the integrated circuit from reaching critical levels. Integrated circuits, like most systems, are sensitive to heat. If the operating temperature of the integrated circuit exceeds a critical level, the integrated circuit may fail. Accordingly, it is important to at least monitor the operating temperature of an integrated circuit and, if necessary, limit that temperature.

Operating integrated circuits can be cooled using a variety of devices. For example, an integrated circuit may be encased in a package which can dissipate, to a varying degree, heat generated by the circuit. The integrated circuit may be cooled by a heat sink attachable to the package. A proximately placed fan can also cool the circuit by directing a stream of air across the surface of the packaged integrated circuit.

According to one conventional method of limiting operating temperature, the aforementioned cooling devices are designed to have just enough capacity to dissipate the maximum amount of heat theoretically capable of being generated by the integrated circuit. This method requires a design engineer to model the integrated circuit and predict which of its various modes of operation will produce the most heat. If the critical mode which generates the maximum amount of heat can be identified, the designer may be able to provide a cooling system, i.e. fans and heat sinks, with just enough capacity to preclude overheating. However, problems may obviously arise when the cooling system, designed for a perceived worst case scenario, does not have the capacity to dissipate heat during an unanticipated high level of integrated circuit. However, it is more likely that design engineers seeking to restrain the cost of cooling systems will select cooling systems without capaity to dissipate unexpected levels of heat generation. In view of this, designers will implement expensive cooling systems with a capacity to dissipate heat far beyond what is anticipated.

The aforementioned method works reasonably well with, for example, simple scalar microprocessor architectures. In critical modes, simple scalar microprocessor architectures can generate up to ten watts of energy. Even though these types of integrated circuits will rarely, if ever, be operated in a critical mode, design engineers sometimes employ expensive cooling devices capable of dissipating huge amounts of heat to insure that simple scalar microprocessors never reach critical temperatures.

Superscalar microprocessor architectures, in contrast to simple scalar devices, are designed to provide as many parallel execution paths as possible in order to execute as many instructions in parallel as possible. In certain operational modes, superscalar microprocessors can generate as much as fifty watts of energy. Typically, these processors are very unlikely to be subjected to a lengthy operational mode in which the entire integrated circuit is constantly active, and thus generating significant amounts of heat. Nonetheless, designers attempt to provide expensive cooling systems which may be capable of maintaining the operating temperature of superscalar microprocessors below critical values. If the designer anticipates that he will be incapable of providing a cooling system with enough capacity to dissipate the high levels of heat generation, the designer may have to resort to other measures, such as universally limiting the top speed of the microprocessor. Clearly, this option degrades performance because the microprocessor is precluded from operating at peak speeds even when its operating temperature is well below critical values.

Another conventional solution to integrated circuit overheating is to proximately place a temperature sensing device near the integrated circuit which constantly measures the integrated circuit temperature. The temperature sensing device outputs a temperature value which can be compared against a predefined limit. When the operating temperature of the integrated circuit exceeds the predefined limit, a command is forwarded to the integrated circuit to reduce its activity level by reducing, for example, the frequency at which instructions are executed or by slowing the system clock. Reducing activity levels results in lower integrated circuit heat generation. In this manner, the integrated circuit can be protected from overheating and the failures associated therewith. Problems however exist with this method of managing integrated circuit heat generation. In particular, temperature sensing devices are expensive to manufacture and prone to failure. In the event the temperature sensor fails, the integrated circuit may experience a prolonged level of activity in which heat is generated under intense circumstances thereby causing the integrated circuit to exceed its critical temperature value and fail.

It would be desirable to produce a mechanism for modeling heat generated from an integrated circuit while allowing the circuit to operate at its highest operational level. The mechanism must be one which, if necessary, can maintain the circuit speed as high as possible yet below a level which would cause temperature-related problems.

SUMMARY OF THE INVENTION

The problems set forth above are, in part, overcome by utilizing temperature modeling hereof. The temperature model provides knowledge of current operational temperature and, therefore, the maximum operational frequency of the circuit. Limits as to circuit speed can be drawn from the model hereof.

In accordance with one aspect of the present invention, the temperature model comprises a modeling circuit. The modeling circuit includes a plurality of multiplexers configured to receive selection signals associated with a plurality of sub-circuits defining the integrated circuit being modeled. Each multiplexer is configured to select one of at least two heat generation signals.

Each heat generation signal is related to heat generated by one of the sub-circuits during a distinct operating mode thereof. An adder receives and adds the heat generation signals to signals representative of (1) heat being dissipated by the integrated circuit, (2) heat being generated by background operations of the integrated circuit, and (3) a previous temperature of the integrated circuit. From these added signals, the adder generates a current or accumulated operating temperature of the integrated circuit. A comparator compares the current operating temperature of the integrated circuit with a predefined limit. When the current operating temperature of the integrated circuit exceeds the predefined limit, the comparator issues a command instructing the integrated circuit to reduce or stop its operational activity and thereby generate less heat. In this manner, the operating temperature of the integrated circuit can be maintained below critical values.

In accordance with another aspect of the present invention, each multiplexer of the temperature modeling circuit is in data communication with a corresponding sub-circuit whereby each heat generation value output from the multiplexer is selected in accordance with the operating mode of the corresponding sub-circuit.

In accordance with yet another aspect of the present invention, the adder of the temperature modeling circuit further includes several interconnected sub-adders where (1) each sub-adder in a first set of sub-adders has at least one input connected to an output of a multiplexer, (2) a second sub-adder has an input connected to the output of a memory device which stores the value relating to the heat generated by background operations of the integrated circuit, (3) a third sub-adder which has an input connected to the output of a circuit which generates the value relating to the heat dissipated by the integrated circuit, (4) a fourth sub-adder which has an input connected to the output of a latch which stores the previous operating temperature of the integrated circuit, and (5) a fifth sub-adder which has a pair of inputs one of which is connected to an output of the fourth adder.

One advantage of the present invention is that it limits the operating temperature of an associated integrated circuit.

Another advantage of the present invention is that it limits the operating temperature of an integrated circuit below a predefined value.

Yet another advantage of the present invention is that it limits the operating temperature of an integrated circuit without relying on a temperature sensor. Present temperature is derived from a model pre-defined as part of the circuit operational characterization. Need for an externally placed sensor, and the problems thereof, are avoided.

Yet another advantage of the present invention is that it precludes the need for design engineers to anticipate critical operating modes of an integrated circuit which generate large amounts of heat.

BRIEF DESCRIPTION OF THE DRAWINGS

Other objects and advantages of the invention will become apparent upon reading the following detailed description and upon reference to the accompanying drawings in which.

Figure 1:
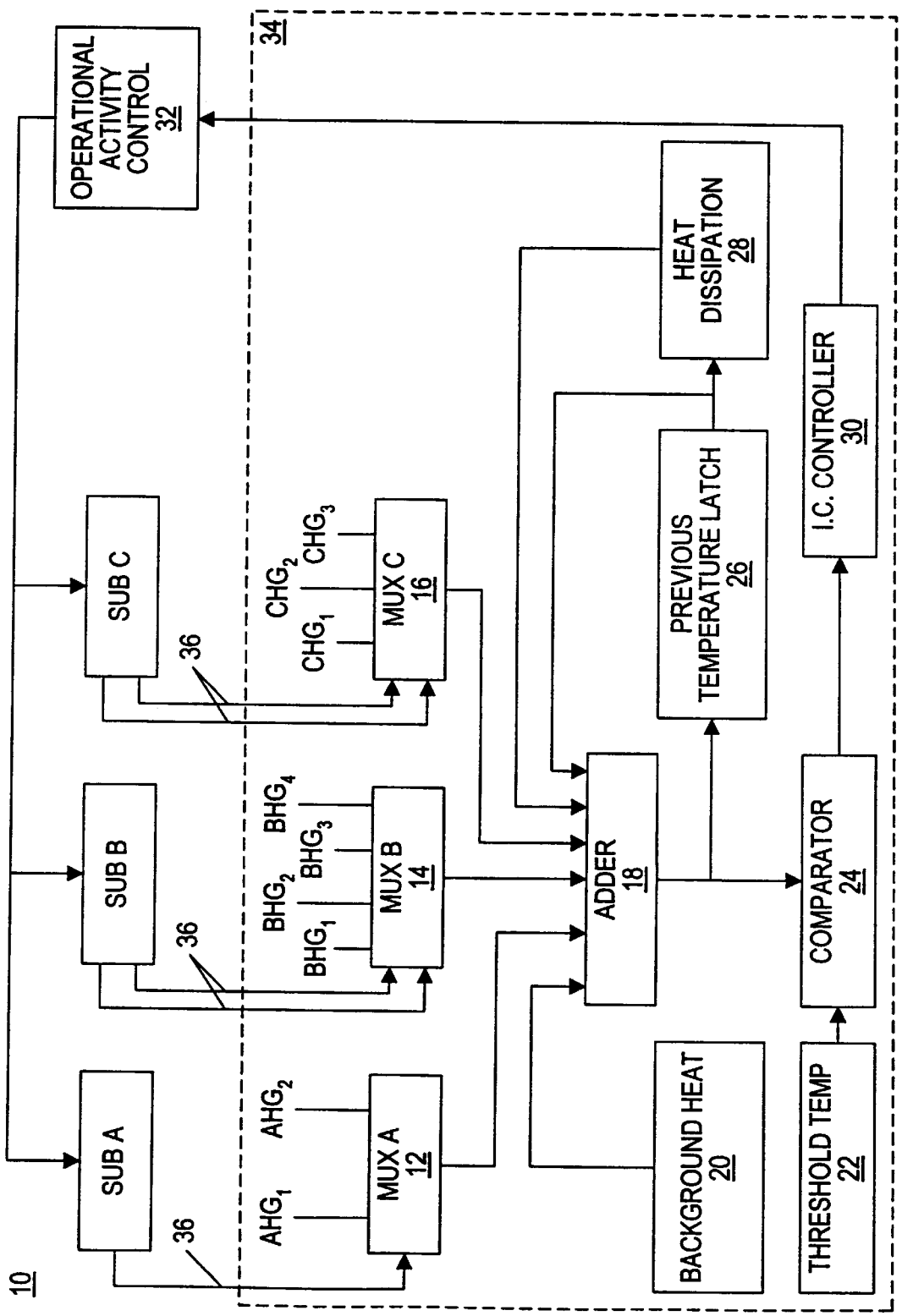
FIG. 1 is a block diagram of an integrated circuit whose temperature is modeled and controlled according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Referring now to the drawings, FIG. 1 shows in block diagram form, an integrated circuit 10 employing the present invention. Integrated circuit 10 includes a plurality of sub-circuits A–C, an operational activity control circuit 32, and a temperature modeling circuit 34. Integrated circuit 10 may or may not be a CPU based device, it being understood that the present invention applies equally to both.

Figure 2:
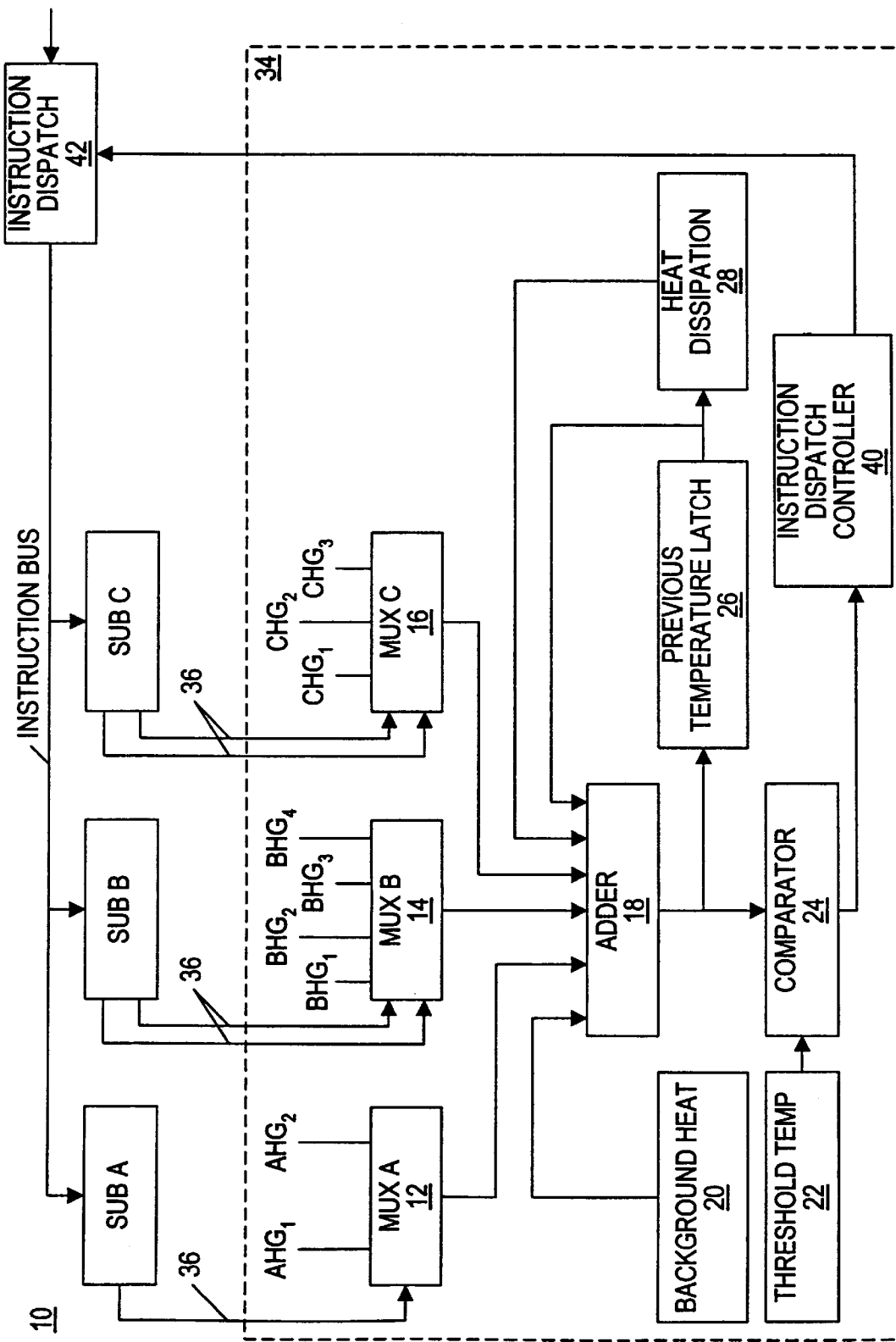
FIG. 2 is a block diagram of an integrated circuit whose temperature is modeled and controlled according to another embodiment of the present invention.
Figure 3:
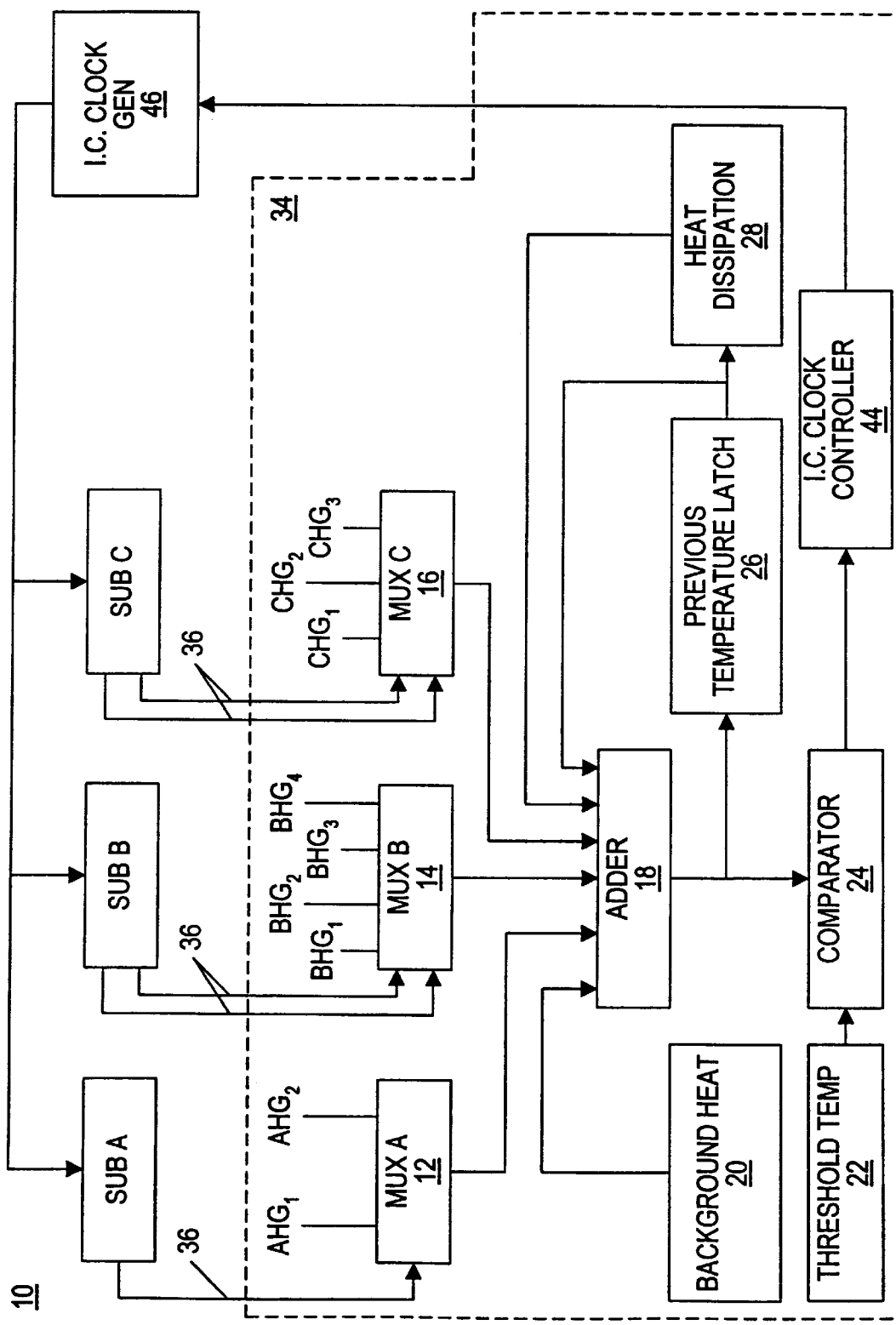
FIG. 3 is a block diagram of an integrated circuit employing the present invention.

Temperature modeling circuit 34 functions to model in real time, the operating temperature of integrated circuit 10. Moreover, temperature modeling circuit 34 operates to limit the operating temperature of integrated circuit 10 below a predefined temperature regardless of an instruction or sequence of instructions received and/or executed by integrated circuit 10. Temperature modeling circuit 34 is shown in FIGS. 1–3 as forming a portion of integrated circuit 10 configured on a single monolithic substrate. It is, however, to be understood that temperature modeling circuit 34 can be a device separate and apart from integrated circuit 10.

Temperature modeling circuit 34 includes a plurality of multiplexers 12–16, an adder 18, a memory device 20 for storing a signal relating to background or quiescent heat generation, a memory device 22 for storing a signal relating to a predefined threshold temperature, a comparator 24, a latch 26 for storing a signal representing a previously generated operating temperature of integrated circuit 10, a heat dissipation circuit 28, and an IC controller 30.

Each of the multiplexers 12–16 has at least two inputs connected to predefined heat generation signals $XHG_Y$. For example, multiplexer 12 has a pair of inputs $AHG_1$ and $AHG_2$. These two heat generation signals, $AHG_1$ and $AHG_2$, are associated with sub-circuit A. In particular, each heat generation signal $AHG_1$ and $AHG_2$ relates to an amount of heat generated by associated sub-circuit A during first and second modes, respectively. In the first mode, sub-circuit A generates an amount of heat directly related (i.e., modeled) by $AHG_1$. In the second mode, sub-circuit A produces an amount of heat directly related (i.e., modeled) by $AHG_2$. Multiplexers 14 and 16 are configured similar to multiplexer 12 and will not be further explained. However, it is to be understood that each multiplexer may have more than two heat generation signals input thereto. For example, multiplexer B may have four heat generation signals. Each signal represents a particular amount of heat which can be generated by the associated sub-circuit.

As shown in FIG. 1, each of the multiplexers 12–16 is in data communication with sub-circuit A–C, respectively. Although the present invention is being explained with reference to three multiplexers, it is understood that the present invention can be implemented with a greater or lessor number of multiplexers. It is, however, important to note that in the preferred embodiment, there should be at least one multiplexer for each sub-circuit of integrated circuit 10. Based on the operation of the sub-circuit, selection is made to one of possibly many heat generation signals. Those signals are indicative of a value which is modeled to represent the operational mode of the respective sub-circuit. The values can be digital numbers, wherein more than one $AHG_x$, $BHG_x$, or $CHG_x$ signal can be active, representative of an encoded digital number. The value of the encoded digital number thereby represents a heat generation magnitude which is forwarded to adder 18 by the "select" signal sent from an operating sub-circuit.

Each of the multiplexers 12–16 are controlled in accordance with signals received upon select lines 36. The select lines 36 transmit select signals corresponding to the operational mode of the associated sub-circuit. Thus, multiplexer 12 has single select line connected to it which transmits either a binary 1 or 0 depending upon the operation mode of the associated sub-circuit A. If the associated sub-circuit A is operating in a first mode, a binary 0 is transmitted to multiplexer 12 causing multiplexer 12 to select or multiplex $AHG_1$ onto the output of multiplexer 12. If select line 36 transmits a 1 corresponding to a second mode of operation of the associated sub-circuit, multiplexer 12 selects or multiplexes $AHG_2$ onto its output. Thus, multiplexer 12, like multiplexers 14 and 16, multiplex one of the several inputted heat generation signals onto an output in accordance with the select signal received where the select signal is generated in accordance with the operational mode of the associated sub-circuit.

Memory device 20 is configured for storing a signal relating to an integrated circuit background or quiescent heat generation. Background or quiescent operations of the integrated circuit 10, such as clock generation and distribution, are constantly active and generally do not vary in activity level. Accordingly, the amount of heat generated by the background operations can be represented as a constant value. This constant can be calculated with precision using well known circuit simulation tools. Once calculated, a corresponding background heat signal can then be stored within memory device 20. Memory device 20 may be a ROM wherein the background heat signal is permanently stored. Alternatively, memory device 20 may be a RAM which allows the stored background heat signal to be changed.

Latch 26 has an input connected to an output of adder 18 and is used for storing the signal representing the accumulated or previously generated operating temperature of integrated circuit 10. This signal is generated in accordance with the present invention. However, the signal representing the previously generated operating temperature stored within the latch does not represent the current operating temperature of the integrated circuit 10. Rather, the signal stored within latch 26 represents a temperature of the integrated circuit which was generated just prior to the generation of the signal representing the current temperature of the integrated circuit. Latch 26 is connected in a feed back loop with adder 18. Latch 26 has an output which is connected to an input of the adder 18. Additionally, the output of latch 18 is connected to an input of heat dissipation circuit 28.

In general the rate at which integrated circuit 10 dissipates heat depends on a number of factors including (1) the integrated circuit temperature, (2) the ambient air temperature, (3) whether the integrated circuit is attached to a heat sink, and (4) whether the integrated circuit is subjected to a flow of air produced by a fan. The higher the temperature of the integrated circuit, the more heat it will dissipate given that the other heat dissipation factors are constant. Integrated circuit 10 varies in temperature in accordance with the internally generated heat. It follows that the heat being dissipated by the integrated circuit 10 likewise varies.

Heat dissipation circuit 28 generates a signal representing a rate at which heat is being dissipated by integrated circuit 10. The heat dissipation circuit 28 is connected to the output of latch 26. Heat dissipation circuit generates the heat dissipation signal as a function of the previously generated integrated circuit temperature stored in latch 26. The heat dissipation circuit 28, however, additionally may calculate the heat dissipation signal as a function of other variables or constants. For example, the generation circuit 28 may generate the heat dissipation signal as a function of an inputted signal representative of the ambient air temperature. Moreover, the heat dissipation generation circuit 28 may be configured to generate the heat dissipation signal as a function of whether a cooling fan or heat sink is provided to enhance cooling.

Adder 18 has a plurality of inputs connected to the outputs of the heat dissipation circuit 28, latch 26, multiplexers 12–16, and memory device 20. As stated earlier, adder 18 generates a signal representative of the current integrated circuit temperature as a function of its inputted signals. This signal, designated as Temp(N+1), can be calculated in accordance with the following equation:

Temp(N+1)=Temp(N)+(Sum of heat generated by each sub-circuit during N)+(Heat of background operations generated during N)−(Heat dissipated during N), where N is a particular instant in time, and Temp(N) is the previously generated integrated circuit operating temperature stored in latch 26. Adder 18 can be configured to generate its signal with each clock cycle of the integrated circuit 10.

Comparator 24 has a pair of inputs connected to the output of memory device 22, which stores a predefined threshold temperature signal, and the output of adder 18. Comparator 24 constantly compares Temp(N+1) with the threshold temperature signal stored in memory device 22. The threshold temperature signal is predefined and represents a temperature value selected the designer which the integrated circuit should not exceed. When Temp(N+1), the signal representing the current integrated circuit operating temperature, exceeds the predefined threshold temperature signal stored within memory device 22, the comparator 24 generates a signal which when received by IC controller 30 causes the integrated circuit controller to generate a command which reduces the level of activity of the integrated circuit 10 via operational activity controller 32. For example, with reference to FIG. 2, comparator 24 may issue a command to an instruction dispatch controller 40 which generates an instruction which temporarily halts, or reduces the frequency at which instruction dispatch 42 issues new instructions to the integrated circuit 10. As a further example, with reference to FIG. 3, comparator 24, may issue a command signal to an IC clock controller 44 which causes IC clock generator 46 to reduce the frequency of the integrated circuit clock.

Figure 5:
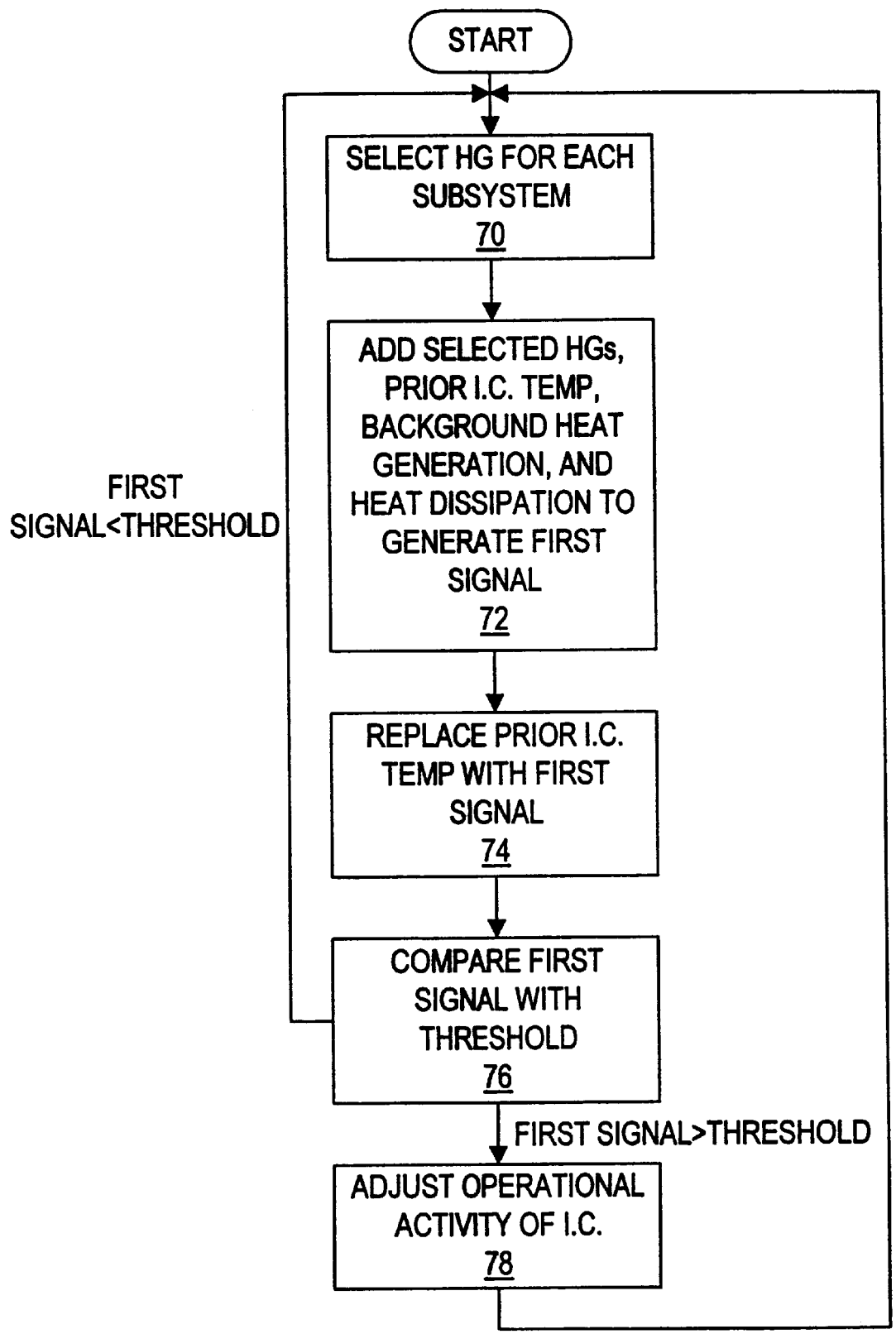
FIG. 5 is a flowchart indicating temperature monitoring and control afforded by the temperature modeling circuit of the present invention.

By reducing or otherwise stopping either the instruction dispatch frequency or the clock frequency, the operational activity of the integrated circuit will be reduced thereby decreasing the amount of heat generated by the integrated circuit. Once the operational activity is reduced or stopped, the integrated circuit operating temperature; through heat dissipation, will eventually reduce to a value below the predefined temperature stored in memory device 22 at which point the circuit operational activity may be resumed or increased With continuing reference to FIG. 1 and with further reference to FIG. 5, the method of tracking and/or limiting the operating temperature of the integrated circuit 10 will now be explained. At any particular time, each sub-circuit A–C of the integrated circuit 10 will be operating in one of at least two distinct operating modes.

In step 70, the heat generation signal associated with each sub-circuit A–C is selected in accordance with selection signals received by multiplexers 12–16. The selected heat generation signals are multiplexed onto the various output lines of the multiplexers 12–16 and inputted into adder 18.

In step 72, adder 18 adds the selected heat generation signals along with the signal representing the previously generated integrated circuit operating temperature stored in latch 26, the background heat generation signal stored in memory device 20, the heat dissipation signal, and a negative value generated by circuit 28. The output of adder 18, represents the current or accumulated temperature of the operating integrated circuit 10.

In step 74, the signal representing the previously generated integrated circuit operating temperature stored in latch 26, is replaced by the current integrated circuit temperature generated by adder 18.

In step 76, comparator 24 compares the current integrated circuit operating temperature signal with the threshold temperature signal stored in memory device 22. If the current temperature signal exceeds the threshold temperature signal, then in step 78 the operational activity of the IC integrated circuit 10 is reduced in accordance with the command generated by the comparator 24. Otherwise, the integrated circuit is not adjusted and steps 70 through 76 are repeated.

The heat generation signals are multi-bit digital signals produced by digital voltage generators (not shown) connected to the inputs of the multiplexers 12–16. The number of bits employed should reflect the level of accuracy sought in modeling the temperature of the integrated circuit 10. The digital voltage generators may be pre-set in accordance with power calculations made before the integrated circuit 10 is implemented in hardware. Namely, integrated circuit 10, including each of the sub-circuits A–B, can be simulated using any one of a number of well known tools which allow a designer to simulate and measure an integrated circuit in various modes of operation without physically making the integrated circuit. Power consumption, and thus heat generation, can be calculated using these design tools. Once heat generation values are calculated for the various modes of operation, the digital voltage generators are set accordingly. It is to be understood, however, that the heat generation signals need not be pre-calculated or constant. Rather, the heat generation signals may be reconfigured to account for physical changes in the associated sub-circuits.

Each sub-circuit A–C of the integrated circuit 10 can be conceptually viewed as a separate heat generator. In one embodiment, each sub-circuit could be considered as capable of being operated in one of only two operational modes, i.e. "on" or "off," and thus capable of generating heat at one of two rates. Viewed this way, each "on" operational mode would be associated with a heat generation signal which is an average of heat generation rates associated with all of the non-quiescent modes, and each "off" operational mode would be associated with heat generated during the quiescent mode. This embodiment does not provide the most accurate model of integrated circuit operating temperature.

In the preferred embodiment, each distinct operational mode of the sub-circuits should have a correspondingly distinct heat generation signal in order to more accurately model the integrated circuit 10. For example, sub-circuit A could be a data cache capable or generating heat at two separate rates depending on whether the data cache is in read or write mode. Sub-circuit B could be an ALU which generates heat at one of several rates corresponding to distinct operational modes such as, for example, add, shift, logic operation or multiply. Sub-circuit C could be viewed as a multiply circuit having three modes of operation which generate three separate amounts of heat. In a first mode there may be no multiply instructions to execute, and the multiply array is in a quiescent state generating no heat. In a second mode, the multiply array may be pre-charging state and generating a very small amount of heat. In a third mode of operation, the multiply array may be executing a multiply instruction and generating a third amount of heat, which is presumed to be relatively independent of the operands and significantly larger than the amount of heat generated during the first and second modes of operation. If a separate heat generation signal can be assigned for each of these different modes of operation, the present invention provides higher resolution in estimating the current operating temperature of integrated circuit 10.

Figure 4:
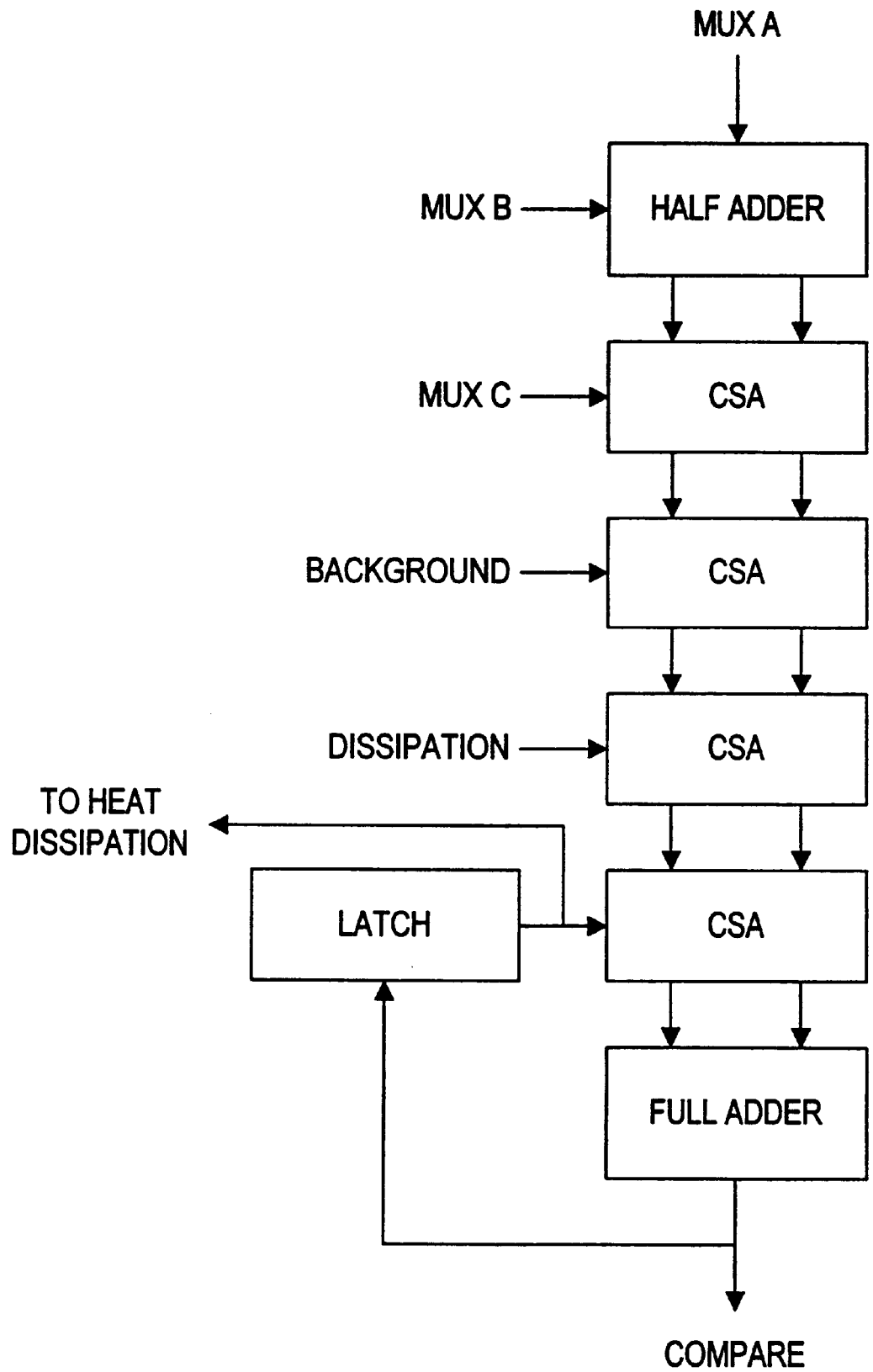
FIG. 4 is a block description of the adder shown in FIGS. 1–3.

FIG. 4 shows an example of adder 18 used in accordance with integrated circuit 10. Adder 18 includes a half adder 50, four carry/save adders 52 through 58, and a full adder 60. Half adder 50 has a pair of inputs each of which is connected to an output of a multiplexer 12–16. Carry/save adder 52 has a pair of inputs, one of which is connected to an output of one of the multiplexers 12–16, the other of which is connected to the output of half adder 50. Carry/save adder 54 has a pair of inputs, a first one of which is connected to memory device 20 which stores the background heat generation signal, and a second one of which is connected to the output of a carry/save adder 52. Carry/save adder 56 has a pair of inputs, a first of which is connected to the output of the heat dissipation generation circuit 28, a second of which is connected to the output of carry/save adder 54. Carry/save adder 58 has a pair of inputs, a first one of which is connected to the output of latch 26, and a second input of which is connected to the output of carry/save adder 56. Full adder 60 has an input which is connected to the output of carry/saver adder 58.

Adder 18 may be implemented as shown in FIG. 4 in order to more quickly add a potentially large number of terms together in one clock signal. In the alternative, the implementation shown in FIG. 4 can be replaced by any of a large number of structures such as those suitable for building an integer multiply unit.

Using the method and apparatus of the present invention, the integrated circuit operating temperature can be maintained below the critical temperature while maintaining speed or enhanced operational activity. Additionally, the method and apparatus of the present invention need not rely upon a sensing device which is prone to failure.

While this invention disclosure has reference to digital signals and adders, it should be apparent to one skilled in the art that the same type of control could be done using analog signals and summing devices.

Numerous variations and modifications will become apparent to those skilled in the art once the above disclosure is fully appreciated. It is intended that the following claims be interpreted to embrace all such variations and modifications.

What is claim is:

1. A method for estimating the temperature of an integrated circuit embodying at least one sub-circuit, comprising:

providing said at least one sub-circuit configured to produce a plurality of heat generation values;

selecting a heat generation value from the plurality of heat generation values, wherein said selecting is performed based on operation of said at least one sub-circuit; and combining said heat generation value with a predetermined heat dissipation value to determine a temperature value corresponding to a current temperature of said integrated circuit.

2. The method as recited in claim 1, further comprises providing a previous temperature of said integrated circuit immediately prior to said current temperature.

3. The method as recited in claim 2, wherein said combining comprises adding said previous temperature with said heat generation value and said heat dissipation value to produce an accumulated temperature value.

4. The method as recited in claim 3, further comprising comparing said accumulated temperature value with a pre-determined threshold temperature value.

5. The method as recited in claim 4, further comprising deactivating said at least one sub-circuit if said accumulated temperature value exceeds said pre-determined threshold temperature value.

6. A method of deriving an accumulated temperature produced by an operating integrated circuit having at least two sub-circuits each capable of operating in distinct modes, the method comprising:

providing at least two sub-circuit heat generation values associated with each of the sub-circuits, wherein each of the heat generation values correspond to heat generated during an operating mode of one sub-circuit;

selecting one of the two heat generation values associated with each sub-circuit, wherein said selecting is based on which of the sub-circuits is currently operating in the integrated circuit; and deriving an accumulated temperature value which relates to the temperature of the operating integrated circuit as a function of the selected heat generation value.

7. The method of claim 6, wherein each heat generation value is predetermined.

8. The method of claim 6, further comprising the step of providing a background heat generation value relating to heat generated during a quiescent operation of the integrated circuit, wherein the accumulated temperature value is derived as a function of the background heat generation value.

9. The method of claim 6, further comprising the step of providing a heat dissipation value relating to heat dissipated during integrated circuit operation, wherein the accumulated temperature value is derived as a function of the integrated circuit heat dissipation value.

10. The method of claim 6, further comprising the step of providing a previous temperature value during a time interval prior to derivation of said accumulated temperature value, and wherein said previous temperature value is configured for addition to said selected heat generation values for deriving said accumulated temperature value.

11. The method of claim 6, further comprising the steps of:

providing a background heat generation value relating to heat generated during a quiescent operation of the integrated circuit;

providing an integrated circuit heat dissipation value relating to heat dissipated by the integrated circuit; and providing a previous temperature value during a time interval prior to said providing a background heat generation value and said an integrated circuit heat dissipation value, wherein the accumulated temperature value is derived as a function of the selected heat generation values, the background heat generation value, the previous temperature value, and the integrated circuit heat dissipation value.

12. The method of claim 11, wherein the step of deriving the accumulated temperature value further includes adding the selected heat generation values, the background heat generation value, the previous temperature value, and the integrated circuit heat dissipation value.

13. The method of claim 11, wherein the integrated circuit heat dissipation value is dependent on the previous temperature value..

14. The method of claim 12, wherein each heat generation value is selected in accordance with the mode of operation of the corresponding sub-circuit.

15. A method of limiting an operating temperature of an integrated circuit having at least two sub-circuits each of which is capable of operating in separate modes, the method comprising:

providing at least two heat generation values corresponding to each sub-circuit, each heat generation value being related to an amount of heat generated by the corresponding sub-circuit during an operational mode;

selecting one of the at least two heat generation values corresponding to each of the sub-circuits, wherein said selecting is based on which of the sub-circuits is currently operating in the integrated circuit;

generating a current temperature value relating to the operating temperature of the integrated circuit as a function of the selected heat generation value;

comparing the current temperature value with a threshold value relating to a predefined integrated circuit temperature; and reducing a rate at which the integrated circuit generates heat when the current temperature value exceeds the threshold value.

16. The method of claim 15, wherein the predefined integrated circuit represents a maximum temperature at which the integrated circuit can operate.

17. The method of claim 15, wherein the heat generation rate of the integrated circuit is reduced by slowing an activity level thereof.

18. The method of claim 15, wherein the heat generation rate of the integrated circuit is reduced by slowing a system clock of the integrated circuit.

19. The method of claim 15, wherein the heat generation of the integrated circuit is reduced by slowing a rate at which instructions are executed by the integrated circuit.

20. The method of claim 15, further comprising the steps of:

providing a background generation value relating to heat generated by the integrated circuit outside of the sub-circuits;

providing an integrated circuit heat dissipation value relating to heat dissipated by the integrated circuit;

providing a prior temperature value relating to an operating temperature of the integrated circuit during a time period prior to the current temperature value generation;

wherein the current temperature value is generated as a function of the selected heat generation values, the background heat generation value, the prior temperature, and the integrated circuit heat dissipation value.

21. The method of claim 15 wherein the step of generating the current temperature value further includes adding the selected heat generation values, the background heat generation value, the prior temperature value, and the integrated circuit heat dissipation value.

22. A method of deriving an accumulated temperature produced by an operating integrated circuit having at least two sub-circuits each capable of operating in distinct modes, the method comprising:

providing at least two sub-circuit heat generation values associated with each of the sub-circuits, wherein each of the heat generation values correspond to heat generated during an operating mode of one sub-circuit;

selecting one of the two heat generation values associated with each sub-circuit;

providing a background heat generation value relating to heat generated during a quiescent operation of the integrated circuit deriving an accumulated temperature value which relates to the temperature of the operating integrated circuit as a function of the selected heat generation value and the background heat generation value.

23. The method of claim 22, wherein each heat generation value is predetermined.

24. The method of claim 22, further comprising the step of providing a heat dissipation value relating to heat dissipated during integrated circuit operation, wherein the accumulated temperature value is also derived as a function of the integrated circuit heat dissipation value.

25. The method of claim 22, further comprising the step of providing a previous temperature value during a time interval prior to derivation of said accumulated temperature value, and wherein said previous temperature value is configured for addition to said selected heat generation values for deriving said accumulated temperature value.

26. A method of limiting an operating temperature of an integrated circuit having at least two sub-circuits each of which is capable of operating in separate modes, the method comprising:

providing at least two heat generation values corresponding to each sub-circuit, each heat generation value being related to an amount of heat generated by the corresponding sub-circuit during an operational mode;

selecting one of the at least two heat generation values corresponding to each of the sub-circuits;

providing a background generation value relating to heat generated by the integrated circuit outside of the sub-circuits;

providing an integrated circuit heat dissipation value relating to heat dissipated by the integrated circuit;

providing a prior temperature value relating to an operating temperature of the integrated circuit during a time period prior to the current temperature value generation;

generating a current temperature value relating to the operating temperature of the integrated circuit as a function of the selected heat generation value, the background heat generation value, the prior temperature value, and the integrated circuit heat dissipation value;

comparing the current temperature value with a threshold value relating to a predefined integrated circuit temperature; and reducing a rate at which the integrated circuit generates heat when the current temperature value exceeds the threshold value.

27. A method for calculating a temperature of an integrated circuit, the integrated circuit comprising a first sub-circuit, wherein the first sub-circuit is configured to operate in one of a first plurality of modes, wherein the first sub-circuit is configured to generate heat at one of a first plurality of heat generation rates, wherein each one of the first plurality of heat generation rates corresponds to a respective one of the first plurality of modes, the method comprising:

storing a first plurality of heat generation values, wherein each of the first plurality of heat generation values corresponds to a respective one of the first plurality of heat generation rates;

the integrated circuit operating, wherein the integrated circuit operating includes the first sub-circuit operating in a first mode, wherein the first mode corresponds to a first heat generation rate, wherein the first heat generation rate corresponds to a first heat generation value, selecting the first heat generation value from the first plurality of heat generation values in response to the first sub-circuit operating in the first mode; and calculating the temperature of the integrated circuit as a function of the selected first heat generation value.

28. The method as recited in claim 27, wherein the integrated circuit temperature is calculated as a function of the first heat generation value and a prior temperature of the integrated circuit.

29. The method as recited in claim 27, further comprising:

comparing said calculated integrated circuit temperature with a pre-determined temperature;

deactivating the first sub-circuit if said calculated temperature exceeds said pre-determined temperature.

30. The method of claim 27, wherein each first heat generation values is predetermined.

31. The method of claim 27, wherein the temperature of the integrated circuit is calculated as a function of the first heat generation value and a background heat generation value, wherein the background heat generation value relates to heat generated during a quiescent operation of the integrated circuit.

32. The method of claim 27, wherein the temperature of the integrated circuit is calculated as a function of the first heat generation value and a heat dissipation value, wherein the heat dissipation value relates to heat dissipated during integrated circuit operation.

33. The method as recited in claim 27, wherein integrated circuit further comprises a second sub-circuit, wherein the second sub-circuit is configured to operate in one of a second plurality of heat generation rates, the method further comprising:

wherein the integrated circuit operating includes the second sub-circuit operating in a second mode of the second plurality of modes, wherein the second mode corresponds to a second heat generation rate, wherein the second heat generation rate corresponds to a second heat generation value;

selecting the second heat generation value from the second plurality of heat generation values in response to the second sub-circuit operating in the second mode; and calculating the temperature of the integrated circuit as a function of the first heat generation value and the second heat generation value.

* * * * *

UNITED STATES PATENT AND TRADEMARK OFFICE
CERTIFICATE OF CORRECTION

PATENT NO.    : 6,098,030
DATED         : August 1, 2000
INVENTOR(S)   : Brian S. McMinn It is certified that error appears in the above-identified patent and that said Letters Patent is hereby corrected as shown below:

Column 12,
Line 51, at the end of the line after the word "second" please insert --plurality of modes, wherein the second sub-circuit is configured to generate heat at one of a second--.

Signed and Sealed this

Fourteenth Day of August, 2001

*Attest:*

*Attesting Officer*

NICHOLAS P. GODICI
*Acting Director of the United States Patent and Trademark Office*